Figure 1:
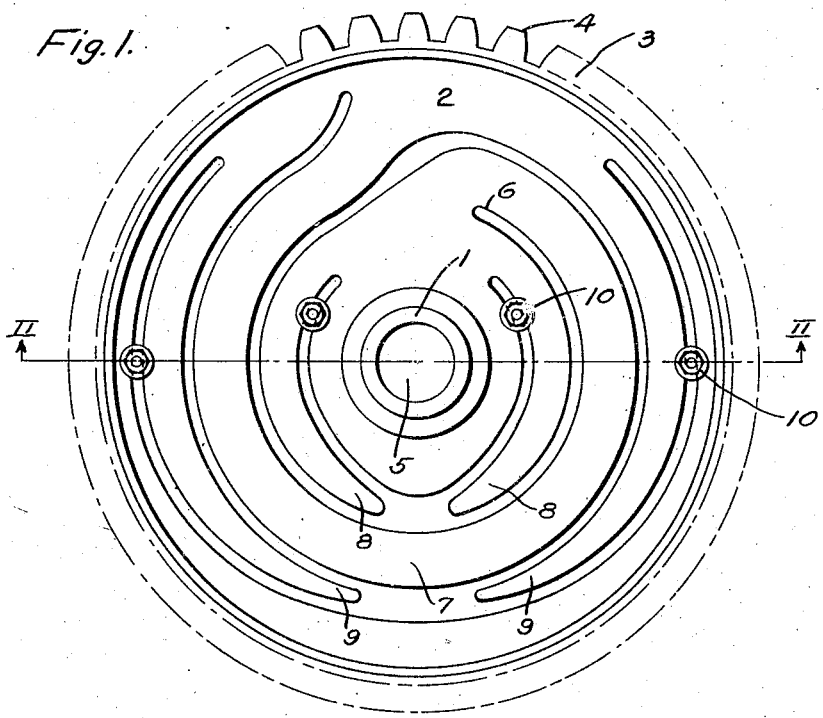

Oct. 11, 1927.

J. K. WOOD 1,645,510

FLEXIBLE ELEMENT

Filed Nov. 8, 1924

WITNESSES:

INVENTOR
Joseph Kaye Wood.
BY
ATTORNEY

Patented Oct. 11, 1927.

1,645,510

UNITED STATES PATENT OFFICE.

JOSEPH KAYE WOOD, OF NEW YORK, N. Y., ASSIGNOR TO WESTINGHOUSE ELECTRIC & MANUFACTURING COMPANY, A CORPORATION OF PENNSYLVANIA.

FLEXIBLE ELEMENT.

Application filed November 8, 1924. Serial No. 748,553.

My invention relates to flexible elements, more particularly to flexible gear elements in which it is desired to provide a resilient connection between the outer working rim or toothed periphery and the center hub portion by means of which it is mounted.

It is among the objects of my invention to provide a flexible gear element which shall be of simple, compact mechanical construction comprising a minimum of parts.

Another object of my invention is to provide a flexible gear wheel in which the flexible element shall constitute an integral part of the wheel member.

Another object of my invention is to provide a flexible gear element of the above designated character in which the flexible element shall be so designed as to give a load-deflection curve characteristic of a highly desirable type.

Still another object of my invention is to provide a flexible element having a spring with a characteristic curve which shall effectively eliminate sustained oscillations.

Various types of gear elements embodying flexible or resilient means have been heretofore proposed which embody different types of flexible elements such as coil springs, spring nests, radial springs and other types and these structures are generally of a very complex nature comprising a plurality of parts which complicates to a great extent the manufacture, assembly and renewal of the gear wheel members. However, since flexible gear wheels are essential for some applications where it is necessary to absorb or diminish the effect of shocks and impacts transmitted through the gears to the delicate part of a drive mechanism or machine, these types of gear wheels have been in common use notwithstanding their many disadvantages.

My present invention is directed to a flexible gear element which eliminates the use of multiple spring units thereby obviating the difficulties heretofore encountered and although my invention is susceptible of various modifications and designs which permit the application of this type of gear wheel to a variety of uses, it is especially applicable for heavy duty service.

In practicing my invention, I utilize a gear wheel of solid construction having expanded rim and hub portions with a web portion of lesser cross section, although this relation is not material. I provide a plurality of slotted openings in the web portion thereof in any suitable manner to provide a flexible connection between the hub and the rim portions, and furthermore, I may form the openings in such manner that the remaining section will function to limit the maximum stress of the material for either direction of rotation.

Figure 2:
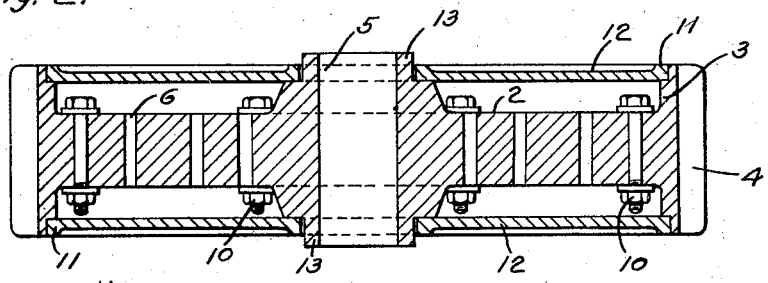
Figure 3:
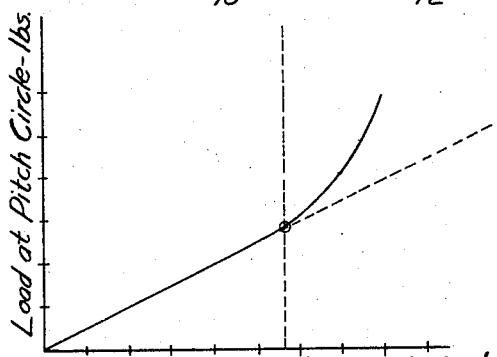

In the accompanying drawing constituting a part hereof and in which like reference characters designate like parts:

Figure 1 is an elevational view of a gear wheel with the side plates removed and embodying the principles of my invention, Fig. 2 is a cross-sectional view thereof taken along the lines II—II of Fig. 1, and Fig. 3 is a load deflection diagram showing the spring characteristic of the gear wheel under load.

Referring to Figs. 1 and 2, the structure therein illustrated comprises integral hub, web and rim sections 1, 2 and 3, respectively, of a gear wheel having its outer periphery provided with gear teeth 4 and the hub member provided with a central opening 5 for mounting the same on an axle or shaft. The web portion 2 is provided with slotted openings 6 formed in the manner shown in Fig. 1, in any suitable manner as by a jig-saw, cutting torch, or electric arc. The width of the opening 6 may be in any proportion to the metal portion, although the minimum width, which may be determined by practical methods, is most desirable since such a design will more readily give the characteristic shown by the curve in Fig. 3.

As shown in Fig. 1, the web portion is so slotted as to provide a central or main coil member 7 which constitutes substantially a ring member in the center of the web, centrally of which are formed a pair of cantilevers 8 of relatively short length and of arcuate shapes. Externally of the coil member 7, I provide another pair of cantilevers 9 of a similar shape but preferably of such size as to give spring action equivalent to that of the central cantilevers 8.

I further provide a plurality of screw bolts 10 which are disposed in the slot 6 on the inner and the outer sides of the cantilevers 8 and 9 respectively as shown in Fig. 1. The object of the screw bolts is to shorten or lengthen the cantilevers in accordance with the load it is desired to transmit.

Referring to Fig. 2, the rim member 3 is provided with radial recesses 11 which are adapted to receive a pair of disks 12 that are placed in, or shrunk on, the rim of the gear. Clearance is provided between the disk and the extensions 13 of the hub portion 1 to permit of relative movement of the hub and rim 1 and 3 respectively. The disks 12 function to maintain the gear wheel concentric at all times and also to prevent grit and other foreign substances from entering the web portion which may be lubricated. The bolts 10 are contained within the cover plates 12 so that the gear wheel has an appearance of a usual gear with straight sided faces on its webbed portion. The plates 12 should be of sufficient thickness to give ample strength. The rubbing or friction between the plates 12 and extensions 13 is desirable since it aids in the dampening of the spring oscillations.

The operation of this device is briefly as follows: Assuming that the gear wheel, Fig. 1 is rotating in a clockwise direction and torque is being transmitted from the rim to the hub or vice versa through the web portion 2, the function of the flexible web portion will be such that the main coil spring 7 presses the cantilevers 8 at their lower extremities thus giving a normal component for the desirable amount of friction. For the opposite direction of rotation, a similar action occurs at the lower extremity of the cantilevers 9. This action is illustrated in the deflection diagram, Fig. 3, and begins at the line 0. With increase of deflection beyond 0 the area of contact between the cantilevers and the main coil spring increases which results in an increasing normal component thereby giving the characteristic shown in Fig. 3. The proper resiliency or spring characteristic of the gear to be used may be obtained by adjusting the screw bolts 10.

It is evident from the above description of my invention that flexible gear elements made in accordance therewith provide simple and durable means for absorbing shock and impact in a running train of gear wheels. The design of the flexible element is such as to provide a large range of resilience and to obtain a desirable amount of friction which renders this type of gear element particularly adapted for jack-shaft gears of electrically propelled railway vehicles. In this type of drive it is necessary to obtain a strong, durable, flexible element which is capable of producing a uniform load distribution on the teeth of a pair of gear wheels coupled at the opposite ends of the jack-shaft. It is also essential to provide a yielding characteristic necessary to absorb the shock or impact resulting from the pounding of the connecting rods or the wheels on the rails to protect the more delicate parts such as the windings of the driving motors.

Although I have described a specific embodiment of my invention, it will be obvious to those skilled in the art, that various changes may be made in the details of construction such as in the proportion and the design of the several co-operating parts without departing from the principles herein set forth.

I claim as my invention:

1. A flexible element comprising a unitary disk-shape member having a cut-out web portion, a part of which constitutes a spring element, and adjustable means for varying certain characteristics of said spring element.

2. A flexible element comprising a unitary disk-shape member having a cut-out web portion, a part of which constitutes a spring element, means for varying the characteristics of said spring element and means for providing a suitable friction component.

3. A flexible element comprising a wheel member having expanded rim and hub portions and a cut-out web portion, said web portion constituting a plurality of pairs of cantilever springs, and adjustable means for varying the characteristics of said springs.

4. A flexible element comprising a wheel member having expanded rim and hub portions and a cut-out web portion, said web portion constituting a plurality of coil and cantilever springs.

5. A flexible element comprising a wheel member having expanded rim and hub portions and a cut-out web portion, said web portion constituting a plurality of coil and cantilever springs and means for varying the effective length of said cantilevers.

6. A flexible element comprising a wheel member having expanded rim and hub portions and a cut-out web portion, said web portion constituting a coil spring having a plurality of cantilever springs disposed internally and externally thereof.

7. A flexible element comprising a wheel member having expanded rim and hub portions and a cut-out web portion, said web portion constituting a coil spring having a plurality of curved cantilever springs disposed internally and externally thereof, means for adjusting the effective length of said cantilevers to provide a desired friction component for either direction of rotation.

In testimony whereof, I have hereunto subscribed my name this 29th day of October, 1924.

JOSEPH KAYE WOOD.